I. P. TICE.
Dynamometer Pulleys.

No. 137,393. Patented April 1, 1873.

Witnesses:
J. J. Bordman
J. B. Badeau

Inventor:
Isaac P. Tice

UNITED STATES PATENT OFFICE.

ISAAC P. TICE, OF NEW YORK, N. Y.

IMPROVEMENT IN DYNAMOMETER-PULLEYS.

Specification forming part of Letters Patent No. 137,393, dated April 1, 1873; application filed March 3, 1873.

*To all whom it may concern:*

Be it known that I, ISAAC P. TICE, of New York, N. Y., have invented certain Improvements in Dynamometer-Pulleys, of which the following is a specification:

This invention relates to a new and improved construction of dynamometer-pulleys for a purpose for which such pulleys have not heretofore been used.

The dynamometer-pulleys heretofore used have registered the total effect of power developed or transmitted. They are too expensive and cumbersome for general use; hence the modification which forms the subject of this application for Letters Patent.

When power is taken from a large engine and distributed among many consumers, serious difficulties arise in determining how much is conveyed by the ordinary belts and pulleys. Hence arises a source of annoyance between landlord and tenant, for which there is not now any simple adequate remedy. This pulley does not measure the total foot-pounds conveyed, but is effective up to the maximum load for which it is adjusted.

The speed of the driving-shaft and the circumference of the pulley are elements from which the resistance of the pulley is determined.

The accompanying drawing represents five views.

Like letters indicate like parts in each view.

Figure 1 is an end view of the belt-pulley A, friction-disk C, shaft B, springs *b b b b*, and friction-blocks *a a a a*.

Fig. 2 is a vertical section through all the parts. A is the belt-pulley; C, friction-disk firmly keyed to the shaft B. *c c'* are bolts passing through springs *b b b b* and through spider D. *a a'* are friction-blocks. E E' are heads bolted to the belt-pulley by the rods *d d'* and seal-nuts *e e'*. Hub *h* is firmly attached to belt-pulley A, upon which is screwed the flanged nut *f*.

Figure 1:
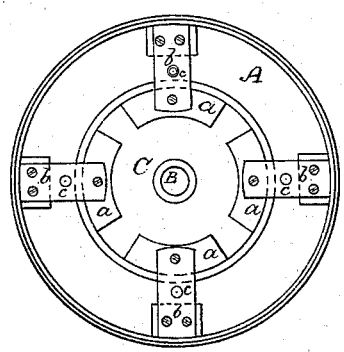
Figure 5:
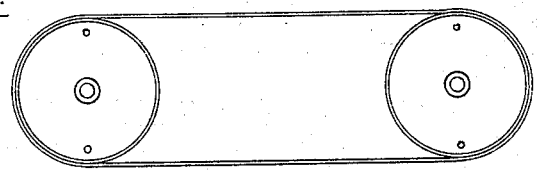
Fig. 5 shows two pulleys—one the driver and the other the driven. To prevent misunderstanding, one pulley is adjusted by the landlord and one by the tenant, each pulley furnishing a check upon the other.
Figure 2:
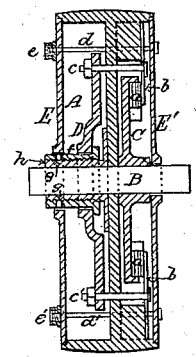
Figure 3:
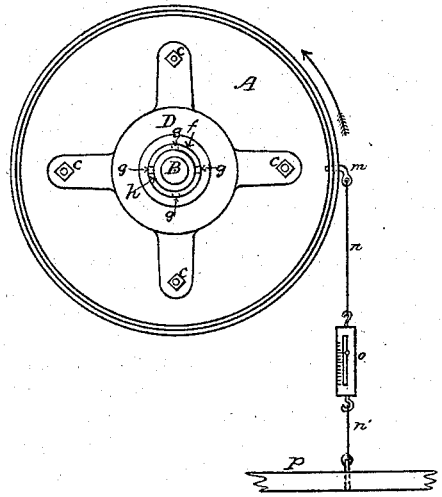
Fig. 3 is an end view of pulley A, spider D, hub *h*, screw-nut *f*, and wrench-openings *g g'*; the catch *m*, link *n n'*, spring-balance *o*, and floor or timber P. The spring-balance shows a convenient method of adjustment.
Figure 4:
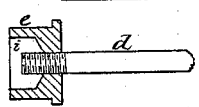
Fig. 4 is a vertical section through the rod *d* and seal-nuts *e*.

When such a pulley is to be adjusted it is necessary to allow the main driving-shaft B to revolve at its regular speed. The belt-pulley is then adjusted to the determined resistance by turning the flanged screw-nut *f*, Fig. 2. This nut bears against the inner side of the spider D, through which the bolts *c c'* pass, being also fastened to the springs *b b b b*, Fig. 1. It is desirable to adjust the pulley without stopping the main shaft, and the arrangement of parts here gives the necessary facilities for so doing.

Claims.

1. I claim the combination of the belt-pulley and its threaded hub A, friction-disk C, springs *b b b b*, spider D, bolts *c c c c*, flanged nut *f*, driving-shaft B, and friction-blocks *a a a a*, as shown and described, for the purpose set forth.

2. I claim the friction-devices and the pulley, excepting its face, inclosed by the heads E E', secured by the bolts and seal-nuts *e e'*, in combination with the heads E E', as shown.

3. I claim two pulleys with adjustable friction devices, in combination with a driving-belt, for the purpose described.

ISAAC P. TICE.

Witnesses:
J. B. BADEAU,
J. J. BORDMAN.